(12) United States Patent
Trask

(10) Patent No.: US 9,561,558 B2
(45) Date of Patent: Feb. 7, 2017

(54) DIFFUSION BONDING MACHINE AND METHOD

(75) Inventor: Richard D. Trask, Simsbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 729 days.

(21) Appl. No.: 13/346,872

(22) Filed: Jan. 10, 2012

(65) Prior Publication Data

US 2013/0175328 A1 Jul. 11, 2013

(51) Int. Cl.
*B23K 20/00* (2006.01)
*B23K 20/02* (2006.01)
*F01D 5/00* (2006.01)

(52) U.S. Cl.
CPC ............. *B23K 20/023* (2013.01); *F01D 5/005* (2013.01); *B23K 2201/001* (2013.01); *B23K 2203/08* (2013.01)

(58) Field of Classification Search
USPC .............. 228/234.1, 44.3; 100/193, 194, 195
See application file for complete search history.

(56) References Cited

U.S. PATENT DOCUMENTS

| | | | | |
|---|---|---|---|---|
| 1,450,481 A | * | 4/1923 | Burroughs | 425/351 |
| 3,190,215 A | * | 6/1965 | Howard et al. | 100/257 |
| 3,765,322 A | * | 10/1973 | Weyer | 100/344 |
| 3,964,958 A | * | 6/1976 | Johnston | 156/382 |
| 4,153,405 A | * | 5/1979 | Elly et al. | 425/338 |
| 5,069,120 A | * | 12/1991 | Schneider | 100/323 |
| 5,242,102 A | | 9/1993 | Nicolas | |
| 2008/0230590 A1 | | 9/2008 | Takahashi et al. | |
| 2010/0247949 A1 | | 9/2010 | VanDyke et al. | |

FOREIGN PATENT DOCUMENTS

| | | |
|---|---|---|
| JP | S5320461 | 6/1978 |
| JP | S57202963 | 12/1982 |
| JP | H10202372 | 8/1998 |

OTHER PUBLICATIONS

EP Search Report for European Application No. 13150858.2-1702 completed May 10, 2013.

* cited by examiner

*Primary Examiner* — Erin Saad
(74) *Attorney, Agent, or Firm* — Carlson, Gaskey & Olds, P.C.

(57) ABSTRACT

An example diffusion bonding machine includes a support structure configured to receive first and second die sets. A heat transfer device is arranged near the support structure and is configured to transfer heat relative to the die sets. A mechanism is configured to separate the die sets from one another during heat transfer. In one example method of diffusion bonding, heat is transferred relative to a space between die sets. The die sets are supported on the support structure, and a load is applied to the die sets to diffusion bond a component within each of the die sets.

11 Claims, 4 Drawing Sheets

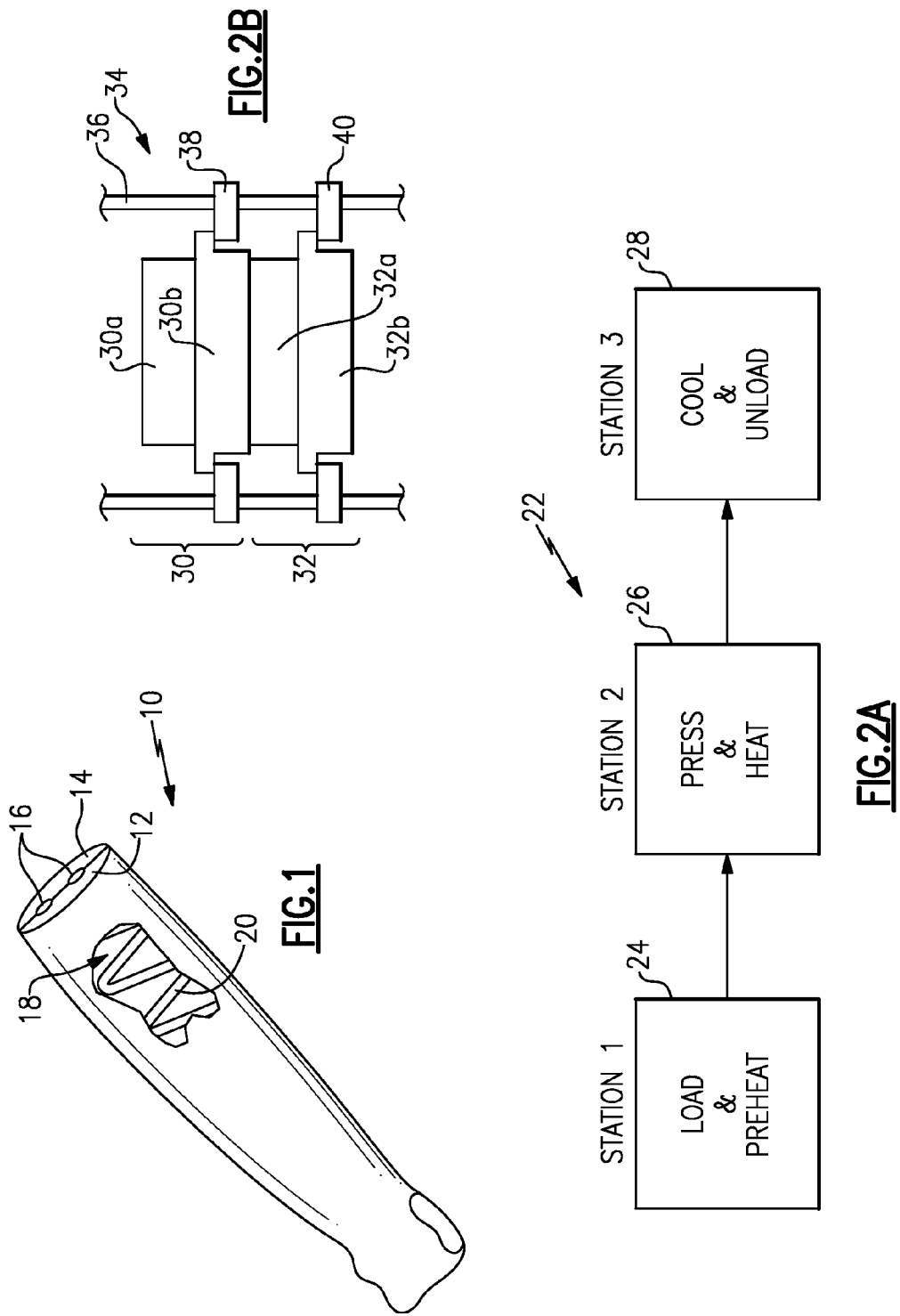

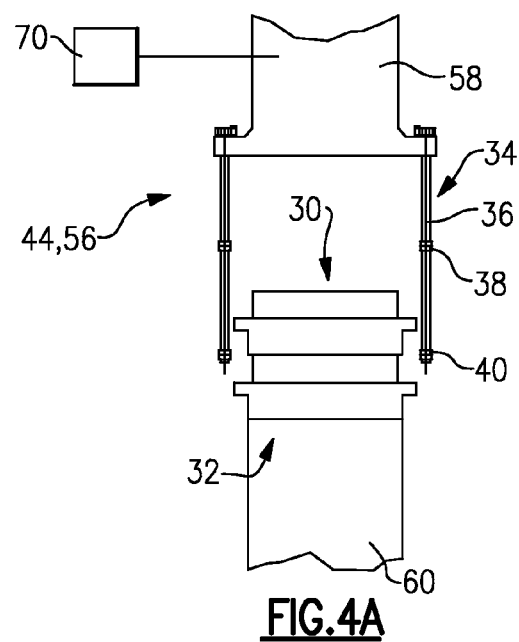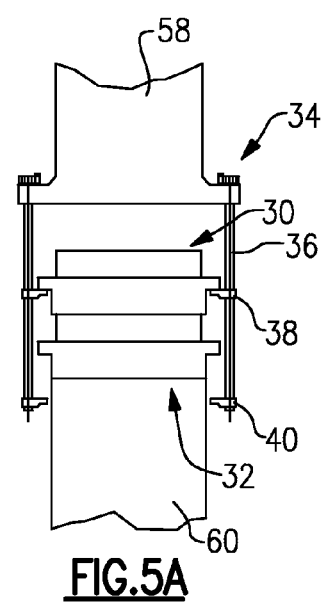
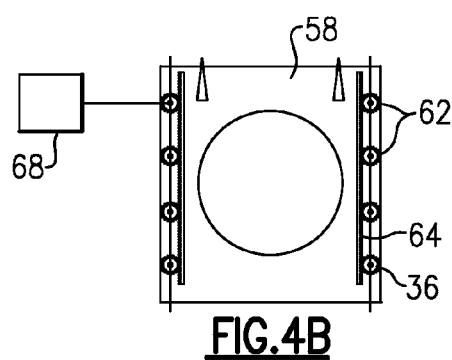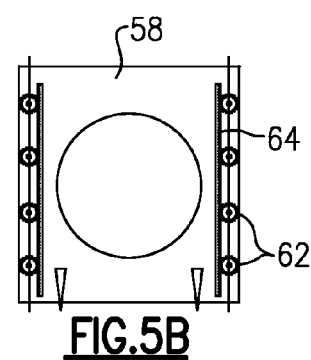

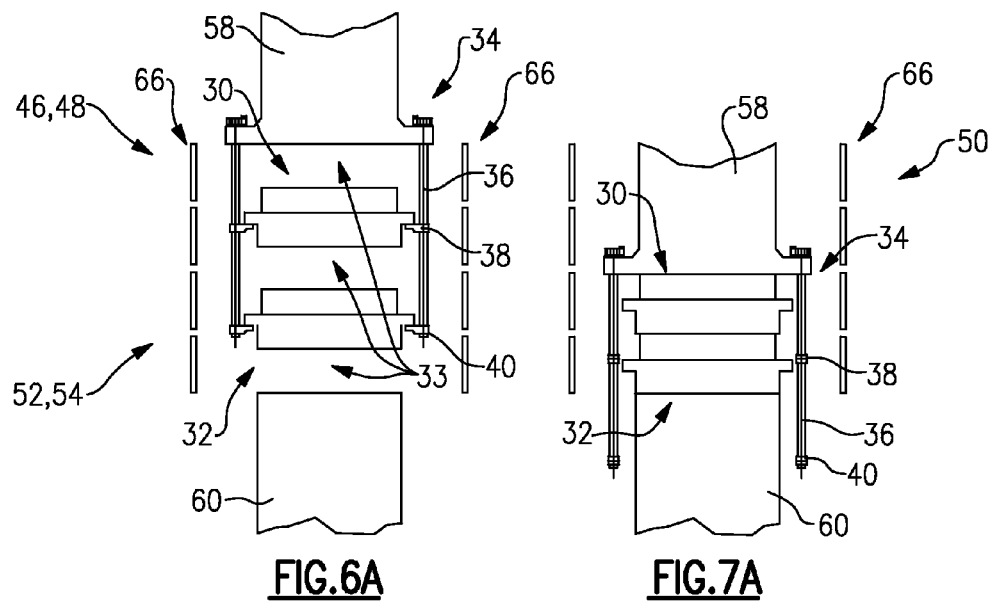
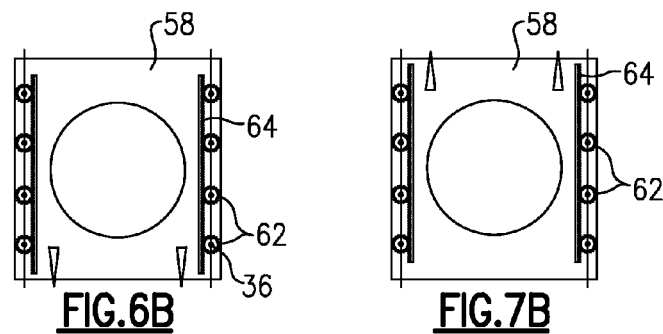
FIG.6A  FIG.7A
FIG.6B  FIG.7B

DIFFUSION BONDING MACHINE AND METHOD

BACKGROUND

This disclosure relates to a diffusion bonding machine and method, for example, for manufacturing hollow blades.

Some hollow fan blades are manufactured by diffusion bonding two halves to one another. The blades are constructed from a titanium alloy, for example. The blade halves typically include features, such as ribs, that must precisely mate with one another to ensure desired bonding between the ribs. Uniform heating is essential to avoid introducing misalignment of the ribs due to temperature distortion. Similarly, after bonding, the dies must be uniformly cooled to avoid temperature induced distortion. Typically, two die sets are stacked vertically onto one another to increase the number of blades processed.

The halves are bonded together by radiantly preheating the blade within an enclosed set of dies before applying pressure sufficient to bond the halves to one another. The die sets are also heated during pressing. The configuration of the stacked dies requires conduction of heat from the outer sides of the die sets to the interior of the die sets where the blades are located. As a result, a very lengthy heating time is required.

One type of diffusion bonding machine includes three stations. The stack of die sets is loaded into the first station and preheated. Pressure is applied to the die stack at a second station and the die sets continue to be exposed to heat at the second station. Once bonding is complete, the die stack is transferred to a third station where the dies are cooled and then unloaded from the third station. Throughout the manufacturing process at the various stations, the die sets remain closed and stacked relative to one another.

SUMMARY

An example diffusion bonding machine includes a support structure configured to receive first and second die sets. A heat transfer device is arranged near the support structure and is configured to transfer heat relative to the die sets. A separating mechanism is configured to separate the die sets from one another during heat transfer.

In a further embodiment of any of the above, the machine includes upper and lower platens, and the lower platen is affixed and corresponds to the support structure. The upper and lower platens are configured to move toward one another to apply a load to the die sets.

In a further embodiment of any of the above, the separating mechanism includes a rod having an arm. The arm is configured to move between retracted and extended positions. The arm is configured to engage and lift the die sets off of the support structure in the extended position.

In a further embodiment of any of the above, a heat transfer device is configured to transfer heat between a space provided between the die sets and the support structure.

A method of diffusion bonding a component includes transferring heat relative to a space between first and second die sets. The first die set is supported on the second die set. A load is applied to the die sets to diffusion bond a component within each of the die sets.

In a further embodiment of any of the above, the method includes loading the die sets onto a support structure prior to performing the heat transferring step.

In a further embodiment of any of the above, the method includes moving the die sets and support structure relative to one another to provide a space.

In a further embodiment of any of the above, wherein the moving step includes lifting the die sets off a platen.

In a further embodiment of any of the above, wherein the heat transferring step includes heating the space and the die sets.

In a further embodiment of any of the above, wherein the heat transferring step includes cooling the space and the die sets.

In a further embodiment of any of the above, wherein the loading step includes pressing the die sets between first and second platens.

In a further embodiment of any of the above, the method includes transferring heat relative to a space between the die sets prior to and subsequent to the load applying step.

In a further embodiment of any of the above, wherein the load applying step includes heating the die sets.

In a further embodiment of any of the above, wherein the heat transferring step, the die sets supporting step and the load applying step are performed at a single station.

BRIEF DESCRIPTION OF THE DRAWINGS

The disclosure can be further understood by reference to the following detailed description when considered in connection with the accompanying drawings wherein:

FIG. 1 is a schematic view of a hollow fan blade.

FIG. 2A is a schematic view of a semi-continuous diffusion bonding process.

FIG. 2B is a schematic view of a lifting mechanism for use at stations 1 and 3 in FIG. 2A.

FIG. 4A is a schematic view of a diffusion bonding machine in a loading and unloading position.

FIG. 4B is a top view of the machine shown in FIG. 4A.

FIG. 5A is a schematic view of the machine in a die set pick-up and drop-off position.

FIG. 5B is a top view of the machine shown in FIG. 5A.

FIG. 6A is a schematic view of the machine in a preheating and cooling position with the die sets separated.

FIG. 6B is a top view of a machine shown in FIG. 6A.

FIG. 7A is a schematic view of a machine during a bond cycle.

FIG. 7B is a top view of the machine shown in FIG. 7A.

DETAILED DESCRIPTION

Figure 3:
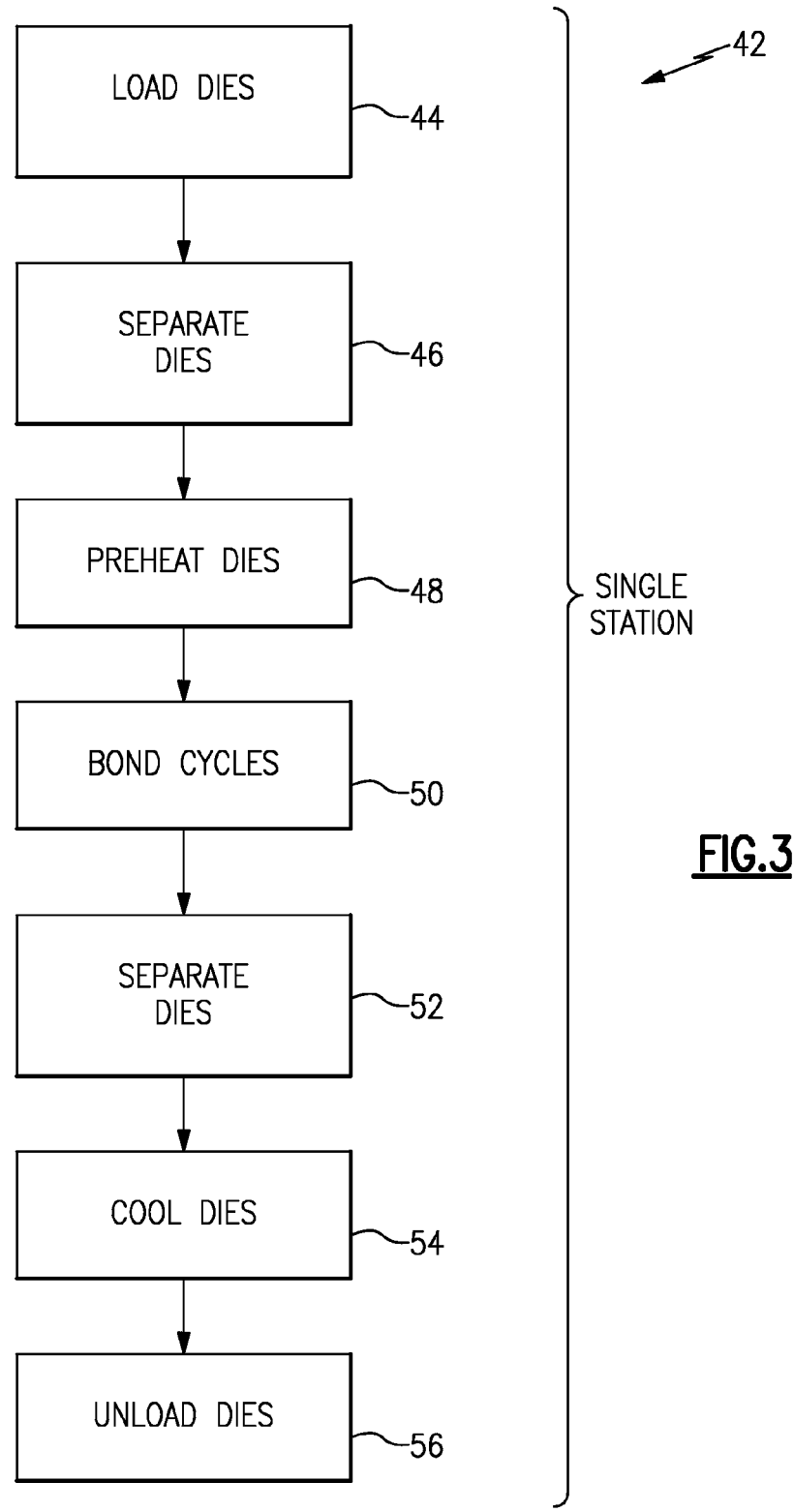
FIG. 3 is a flow chart depicting a diffusion bonding process at a single station.

FIG. 1 schematically illustrates a component 10, such as a blade. In one example, the component 10 is a hollow fan blade constructed from titanium. The component 10 includes first and second portions 12, 14 that provide an internal cavity 18. Ribs 20 are provided on each of the first and second portions 12, 14 and engage one another at a parting line at which the first and second portions 12, 14 mate. Typically, tack welds 16 are used to secure the first and second portions 12, 14 to one another throughout processing. It is desirable to maintain the ribs 20 in alignment with one another during the bonding process to provide the desired strength.

One example of a semi-continuous diffusion bonding process is schematically illustrated in FIG. 2A. The process 22 includes three stations. A stack of dies are loaded into Station 1, indicated at 24. Each die set typically includes two halves defining a cavity within which the component 10 is received. Multiple die sets are stacked onto one another. Referring to FIG. 2B, the first and second die sets 30, 32 each include upper and lower dies 30A, 30B and 32A, 32B. The upper and lower dies remain closed about the components arranged within the die sets.

To improve cycle times on the semi-continuous process 22, a separating mechanism 34 is used to separate the upper and lower dies from one another (shown in FIG. 2B), improving heat transfer to each die set and, ultimately, to the component 10 within. In one example, the separating mechanism 34 is located at Station 1 and includes members 36, such as rods, having first and second arms 38, 40 affixed to the rods. The arms 38, 40 cooperate with features on the lower dies 30B, 32B to lift, for example, the upper die set off the lower die set and the lower die set off its support structure (discussed in more detail below with respect to FIG. 6A).

The stack of die sets is preheated at Station 1 with the die sets separated. Once the desired temperature of the components 10 arranged within the stack has been achieved, the stack is transferred to Station 2, indicated at 26 in FIG. 2A. Pressure is applied to the die stack at Station 2, and heat is continuously applied to the die stack. Typically, the press includes a stationary upper platen. A removable lower platen is raised to engage the die stack with the upper platen. Once sufficient bonding has been achieved between the first and second portions 12, 14, the die stack is transferred to Station 3, as indicated at 28. Another separating mechanism 34, located at Station 3, is used to separate the upper and lower dies from one another, improving heat transfer to and from the component 10 supported by the lower die. The die sets are permitted to cool and subsequently unloaded.

The separating mechanism 34 illustrated in FIG. 2B may also be used to provide an efficient single station, as schematically shown in FIG. 3. All of the steps performed in the semi-continuous process may be efficiently performed at a single station with the incorporation of the separation mechanism. The single station process 42 includes loading a stack of dies, as indicated at 44 (e.g., FIG. 4A). The die sets are separated from one another the support structure, such as a lower platen, as indicated at 46 (e.g. FIG. 6A). With the die sets separated, the die sets are preheated, as indicated at 48 (e.g. FIG. 6A). Once the desired temperature of the internally located components 10 is reached, the die sets are again stacked on one another and the supporting platen (e.g. FIG. 5A). The dies are pressed together by opposing platens as heat is applied during a bond cycle, as indicated at 50 (e.g. FIG. 7A). Once bonding has been achieved, the die sets are again separated from one another and the supporting platen, as indicated at 52 (e.g. FIG. 6A). The dies and their internally located components 10 are cooled, as indicated at 54 (e.g. FIG. 6A). Once the dies and components have been sufficiently cooled, the die sets are stacked onto one another and the supporting platen and then unloaded, as indicated at 56 (e.g., FIG. 5A).

An example single station diffusion bonding machine is shown in FIGS. 4A-7B. First and second die sets 30, 32 are arranged between upper and lower platens 58, 60. A hydraulic actuator is coupled to the upper platen 58 in the example to move the upper platen 58 during the bond cycle. The separating mechanism 34 is located includes members 36, such as rods, having first and second arms 38, 40 affixed to the rods. The arms 38, 40 cooperate with features on the die sets 30, 32, as previously described. In the example, the members 36 included pinions 62 that are connected to one another by a rack 64. An actuator 68 manipulates the rack 64 to rotate the arms 38, 40 via the members 36 between the positions shown in FIGS. 4A and 4B. The arms 38, 40 are shown retracted in FIGS. 4A and 4B, and ready to engage the die sets 30, 32 for lifting and lowering in FIGS. 5A and 5B.

With the arms 38, 40 engaging the die sets 30, 32, raising the upper platen 58 engages the arms 38, 40 with the die sets 30, 32 to separate the die sets 30, 32 and provide gaps 33 around the die sets 30, 32 and any support structure, as shown in FIGS. 6A and 6B. A heat transfer device 66, which includes heating and/or cooling elements, is arranged near the die sets 30, 32 to heat and/or cool the die sets 30, 32 and their internally arranged components 10. The arms 38, 40 are retracted during the bonding cycle shown in FIGS. 7A and 7B in which the die sets 30, 32 are pressed between the upper and lower platens 58, 60. The die sets 30, 32 are heated by the heat transfer device 66 during pressing.

Although an example embodiment has been disclosed, a worker of ordinary skill in this art would recognize that certain modifications would come within the scope of the claims. For that reason, the following claims should be studied to determine their true scope and content.

What is claimed is:

1. A diffusion bonding machine comprising:
   a work station;
   a support structure receiving first and second stacked die sets, each of the first and second die sets configured to receive a component within each of the first and second die sets;
   a heat transfer device at the work station and arranged near the support structure and configured to transfer heat relative to the die sets; and
   a separating mechanism at the work station and configured to move the first and second die sets from a contacting position to a separated position in which a space is provided between the first and second die sets with each of the first and second die sets closed about its respective component during heat transfer.

2. The diffusion bonding machine according to claim 1, comprising upper and lower platens, the lower platen fixed and corresponding to the support structure, the upper and lower platens in spaced relation to both the first and second die sets in the separated position and configured to move toward one another to apply a load to the first and second die sets.

3. The diffusion bonding machine according to claim 1, wherein the separating mechanism includes a rod having an arm, the arm configured to move rotatably between retracted and extended positions, the arm configured to engage and lift the die sets off of the support structure in the extended position.

4. The diffusion bonding machine according to claim 1, wherein the heat transfer device is configured to transfer heat between the space provided between the die sets and the support structure.

5. The diffusion bonding machine according to claim 1, wherein the heat transfer device is arranged outside of and adjacent to the space.

6. The diffusion bonding machine according to claim 1, wherein each of the first and second die sets includes upper and lower dies that remain closed about their respective component with the first and second die set in the separated position.

7. The diffusion bonding machine according to claim 1, wherein the heat transfer device includes an activated condition in which the heat transfer device transfers heat between the space and the heat transfer device with the first and second die sets in the separated position.

8. The diffusion bonding machine according to claim 7, wherein the heat transfer device is a cooling element.

9. The diffusion bonding machine according to claim 7, wherein the heat transfer device is a heating element.

10. The diffusion bonding machine according to claim 1, wherein the support structure is at the work station.

11. The diffusion bonding machine according to claim 1, wherein the first and second die sets each include upper and lower dies and a cavity in which the component is received.

* * * * *

UNITED STATES PATENT AND TRADEMARK OFFICE
CERTIFICATE OF CORRECTION

PATENT NO. : 9,561,558 B2
APPLICATION NO. : 13/346872
DATED : February 7, 2017
INVENTOR(S) : Richard D. Trask Page 1 of 1

It is certified that error appears in the above-identified patent and that said Letters Patent is hereby corrected as shown below:

In the Claims

In Claim 1, Column 4, Line 25; after "a support structure" replace "receiving" with --configured to receive--

In Claim 1, Column 4, Line 25; after "first and second" delete "stacked"

In Claim 1, Column 4, Line 33; after "configured to" replace "move the first and second die sets from a" with --provide--

In Claim 1, Column 4, Line 34; delete "contacting position to"

In Claim 7, Column 4, Line 63; after "machine according to" replace "claim 1" with --claim 4--

Signed and Sealed this
Fifth Day of June, 2018

Andrei Iancu
*Director of the United States Patent and Trademark Office*